United States Patent [19]

Bowman

[11] Patent Number: 4,737,756
[45] Date of Patent: Apr. 12, 1988

[54] ELECTROSTATICALLY BONDED PRESSURE TRANSDUCERS FOR CORROSIVE FLUIDS

[75] Inventor: Ronald Bowman, Laguna Beach, Calif.

[73] Assignee: Imo Delaval Incorporated, Lawrenceville, N.J.

[21] Appl. No.: 1,408

[22] Filed: Jan. 8, 1987

[51] Int. Cl.$^4$ .............................................. G01L 1/22
[52] U.S. Cl. ........................................... 338/4; 338/5; 338/36; 29/610 SG
[58] Field of Search ............................ 338/4, 2, 5, 36; 29/610 SG, 592 R

[56] References Cited

U.S. PATENT DOCUMENTS

| | | | |
|---|---|---|---|
| 3,397,278 | 8/1968 | Pomerantz | 174/52 |
| 3,417,459 | 12/1968 | Pomerantz et al. | 29/472.9 |
| 3,470,348 | 9/1969 | Pomerantz et al. | 219/117 |
| 3,505,634 | 4/1970 | von Vick | 338/4 |
| 3,662,312 | 5/1972 | Thorp et al. | 338/4 |
| 3,753,196 | 8/1973 | Kurtz et al. | 338/4 |
| 3,819,431 | 6/1974 | Kurtz et al. | 338/4 X |
| 4,125,820 | 11/1978 | Marshall | 338/4 |
| 4,314,226 | 2/1982 | Oguro et al. | 338/4 |
| 4,411,158 | 10/1983 | Schaff, Jr. | 73/721 |

*Primary Examiner*—E. A. Goldberg
*Assistant Examiner*—Marvin M. Lateef
*Attorney, Agent, or Firm*—Benoit Law Corporation

[57] ABSTRACT

Differential transducers for corrosive or electrically conductive fluids have a first tube for guiding such fluids toward one side of a semiconductor diaphragm containing embedded strain gages, and a second tube for guiding such fluids toward an opposite side of that semiconductor diaphragm. These tubes are made of an electrically insulating material temporarily convertible to an electrical conductor for electrostatic bonding. The semiconductor diaphragm is provided in a semiconductor wafer extending beyond the perimeter of at least the first tube. The strain gages are provided with embedded electrical leads extending beyond the above mentioned perimeter for attachment of electrical contact wires outside the first tube, while providing these leads inlaid in the semiconductor wafer at least in a region to be covered by the first tube. The wafer including the semiconductor diaphragm is integrally sandwiched between layers of material providing electrical conduction for electrostatic bonding at the tubes and electrical insulation and isolation of the diaphragm and strain gages from corrosive or electrically conductive fluids guided toward the diaphragm by the tubes. Each of the tubes is temporarily converted to an electrical conductor, and these first and second tubes are electrostatically bonded to the above mentioned layers with the aid of the above mentioned electrical conduction, to form the tubes, layers and wafer with semiconductor diaphragm, strain gages and electrical leads into an integrated bonded structure.

20 Claims, 2 Drawing Sheets

ELECTROSTATICALLY BONDED PRESSURE TRANSDUCERS FOR CORROSIVE FLUIDS

BACKGROUND OF THE INVENTION

1. Field of the Invention

The subject invention relates to pressure transducers and, more specifically, to methods for making differential pressure transducers for corrosive or conductive fluids by electrostatic bonding, and to electrostatically bonded pressure transducers for corrosive or conductive fluids.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

As mentioned in U.S. Pat. No. 3,505,634, by G. Von Vick, issued Apr. 7, 1970 for differential pressure transducer, the prior art has resorted to the use of two different transducers, or has required a double bellows or other relatively complex arrangement for differential pressure measurements involving two corrosive media. Conventional practice for providing media isolation of the electrically active side of strain gage pressure transducers required installation of a compliant isolating diaphragm, with oil or another dielectric fluid, acting as a pressure transfer medium and filling the cavity between the isolating diaphragm and the side of the measuring diaphragm carrying the electrical strain gages. For transducers in which the measuring diaphragm is silicon or another semiconductor, with integral diffused strain gages, it is also necessary to electrically isolate the inactive side of the diaphragm from electrically conductive fluids. Use of isolator diaphragms with oil fill is conventional practice here also.

The isolator diaphragm/oil fill approach is expensive, adds error to measurement, due to the characteristics of the isolator diaphragm or diaphragms, limits environmental operating temperature range, and adds moving system mass or masses, making such transducers highly sensitive to vibration, acceleration and orientation.

The above mentioned Von Vick patent proposes protection from the media by covering layers comprising organic or ceramic material that is inert to the media, as therein described. The bilaterally covered diaphragm is located between tubular members defining opposite pressure ports and having lateral flanges connected by bolts or fasteners to an annular thickened body at the periphery of the diaphragm.

U.S. Pat. No. 3,662,312, by W. Thorp et al, issued May 9, 1972, discloses semiconductor strain transducers in which a semiconductor wafer is bonded to a rigid metal supporting ring which, in turn, is bonded to an annular insulating member secured to the transducer housing. An electrically insulating layer of silicon dioxide is deposited on the non-resistor bearing major wafer face to prevent current leakage in the presence of a conductive medium whose pressure is to be measured. A metallic coating is provided on the silicone dioxide layer so as to make good electrical contact with the metal housing, thereby removing interference from radio frequency or other alternating current flow.

U.S. Pat. Nos. 3,753,196, issued Aug. 14, 1973, and 3,819,431, issued June 25, 1974, by Kurtz et al, disclose transducers employing integral protective coatings and support and methods for making same. A silicon diaphragm is mounted in a housing, with piezo-resistive sensing elements facing away from the applied force surface having formed thereon a layer of silicon dioxide which serves to protect the diaphragm against deleterious agents present in the force transmitting environment, while further serving to eliminate an undesirable bimetallic effect. Kurtz et al expressly prefer that to prior-art approaches in which the silicon diaphragm was coated with a grease-like compound or an epoxy, or in which protective layers of gold, platinum or other metal, rubber or the like were bonded or glued to the diaphragm. Kurtz et al expressly designated such approaches as unreliable and expensive.

U.S. Pat. No. 4,314,226, by T. Oguro et al, issued Feb. 2, 1982, shows a prior-art type of silicon diaphragm having a film of silicon dioxide formed thereon and of the fused resistors, and aluminum leads formed on that film and electrically connected to these resistors. Oguro et al mentioned that such an arrangement is not adequate for differential pressure transducers, and proposed an approach in which a protective layer, including a silicon epitaxial layer, opposite in conductive type to the resistors, is formed thereon and on the silicon base, followed by the formation of an electrically insulating silicon dioxide layer on the silicon epitaxial layer.

U.S. Pat. No. 4,411,158, by A. Schaff, Jr., issued Oct. 25, 1983 for apparatus for sensing the condition of a fluid, discloses a semiconductor chip having a diaphragm portion adapted for exposure to pressurized fluid and an adjacent terminal portion adapted for connection to external circuitry for providing a measurement of the condition of the fluid. The semiconductor chip has sensing elements formed within the diaphragm portion and conductor elements in electrical contact with the sensing elements formed within and extending from the diaphragm portion to the terminal portion. The diffusion process, by which strain gage resistors are diffused into the basic silicon wafer or chip by conventional planar diffusion or ion implantation, includes the growing of a protective layer of silicon dioxide over the diffused or implanted areas. Conventional cement is employed for providing a fluid barrier isolating the diaphragm portion from the terminal portion. Opposite high and low pressure fluid ports are provided by matching cartridge halves which are cemented to each other.

For electrostatic bonding, reference may be had to U.S. Pat. Nos. 3,397,278, by D. I. Pomerantz, issued Aug. 13, 1968, for Anodic Bonding, 3,417,459 and 3,470,348 by D.I. Pomerantz et al, issued Dec. 24, 1968 and Sept. 30, 1969 for Bonding Electrically Conductive Metals to Insulators, and for Anodic Bonding of Liquid Metals to Insulators, respectively. Briefly, an electrically conductive element is bonded to an insulator element by placing the elements in close surface contact, heating the insulator element to render it electrically conductive, and applying a potential across the elements thereby creating an electrostatic field for bonding the elements to each other.

Conventionally, strain gages are mounted by means of epoxy. Obvious problems are a tendency of the epoxy to creep under repeated applications of stress and the limited temperature range of the epoxy.

SUMMARY OF THE INVENTION

It is a general object of this invention to overcome the disadvantages and to meet the needs expressed or explicit in the above Information Disclosure Statement or in other parts hereof.

It is a germane object of this invention to provide improved methods of making differential transducers for corrosive or electrically conductive fluids.

It is a related object of this invention to provide improved differential transducers for corrosive or conductive fluids.

It is also an object of this invention to eliminate the need for isolator diaphragms and oil fillings in transducers for corrosive or electrically conductive fluids.

It is a related object of this invention to provide improved systems for protecting and isolating the measuring diaphragm and the electrical strain gage circuit from deleterious effects of corrosive and conductive fluids.

It is also an object of this invention to avoid the need of circumferential bolts, fasteners and cement bonds in differential transducers and in their manufacture.

Other objects of the invention will become apparent in the further course of this disclosure.

From one aspect thereof, the subject invention resides in a method of making a differential transducer for corrosive or electrically conductive fluids guided by a first tube toward one side of a semiconductor diaphragm containing embedded strain gages, and guided by a second tube toward an opposite side of said semiconductor diaphragm. The invention according to this aspect resides, more specifically, in the improvement comprising in combination the steps of making the tubes of an electrically insulating material temporarily convertible to an electrical conductor for electrostatic bonding, providing the semiconductor diaphragm in a semiconductor wafer extending beyond the perimeter of at least the first tube, providing the strain gages with embedded electrical leads extending beyond the mentioned perimeter for attachment of electrical contact wires outside the first tube, while providing the mentioned leads inlaid in the semiconductor wafer at least in a region to be covered by the first tube, integrally sandwiching the wafer including the semiconductor diaphragm between layers of material providing electrical conduction for electrostatic bonding at the mentioned tubes and electrical insulation and isolation of the diaphragm and strain gages from corrosive or electrically conductive fluids guided toward the diaphragm by the tubes, temporarily converting each of the tubes to an electrical conductor, and electrostatically bonding the first and second tubes to the mentioned layers with the aid of the mentioned electrical conduction to form the tubes, layers and wafer with semiconductor diaphragm, strain gages and electrical leads into an integrated bonded structure.

The expression "embedded" as herein employed is intended to cover formation of electrical leads and strain gages by diffusion, ion implantation, and other suitable methods.

From a related aspect thereof, the subject invention resides in a method of making a differential transducer for corrosive or electrically conductive fluids guided by a first tube toward one side of a semiconductor diaphragm containing embedded strain gages, and guided by a second tube toward an opposite side of said semiconductor diaphragm, and, more specifically, resides in the improvement comprising in combination the steps of making the tubes of an electrically insulating material temporarily convertible to an electrical conductor for electrostatic bonding, providing the semiconductor diaphragm in a semiconductor wafer extending beyond the perimeter of at least the first tube, providing the strain gages with embedded electrical leads extending beyond the mentioned perimeter for attachment of electrical contact wires outside the first tube, while providing the mentioned leads inlaid in the semiconductor wafer at least in a region to be covered by the first tube, integrally sandwiching the wafer including the semiconductor diaphragm between layers of material providing electrical insulation and isolation of the diaphragm and strain gages from corrosive or electrically conductive fluids guided toward the diaphragm by the tubes, and being temporarily convertible to an electrical conductor for electrostatic bonding to the tubes, temporarily coverting each of the tubes and the layers of material to an electrical conductor, and electrostatically bonding the first and second tubes to the mentioned layers with the aid of the mentioned electrical conduction to form the tubes, layers and wafer with semiconductor diaphragm, strain gages and electrical leads into an integrated bonded structure.

From a further related aspect thereof, the subject invention resides in a differential transducer for corrosive or conductive fluids, comprising, in combination, an integrated bonded structure of a semiconductor wafer including a semiconductor diaphragm containing embedded strain gages and being sandwiched between layers of material electrically insulating and isolating the diaphragm and strain gages from the corrosive or conductive fluids, and first and second tubes electrostatically bonded to the mentioned layers on opposite sides of the semiconductor wafer for guiding corrosive or electrically conductive fluids to the mentioned layers at the semiconductor diaphragm, with the semiconductor wafer extending beyond the perimeter of at least one of the tubes, and the strain gages having embedded electrical leads extending beyond the mentioned perimeter for attachment of electrical contact wires outside the mentioned one tube and being inlaid in the semiconductor wafer at least in a region covered by that one tube.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
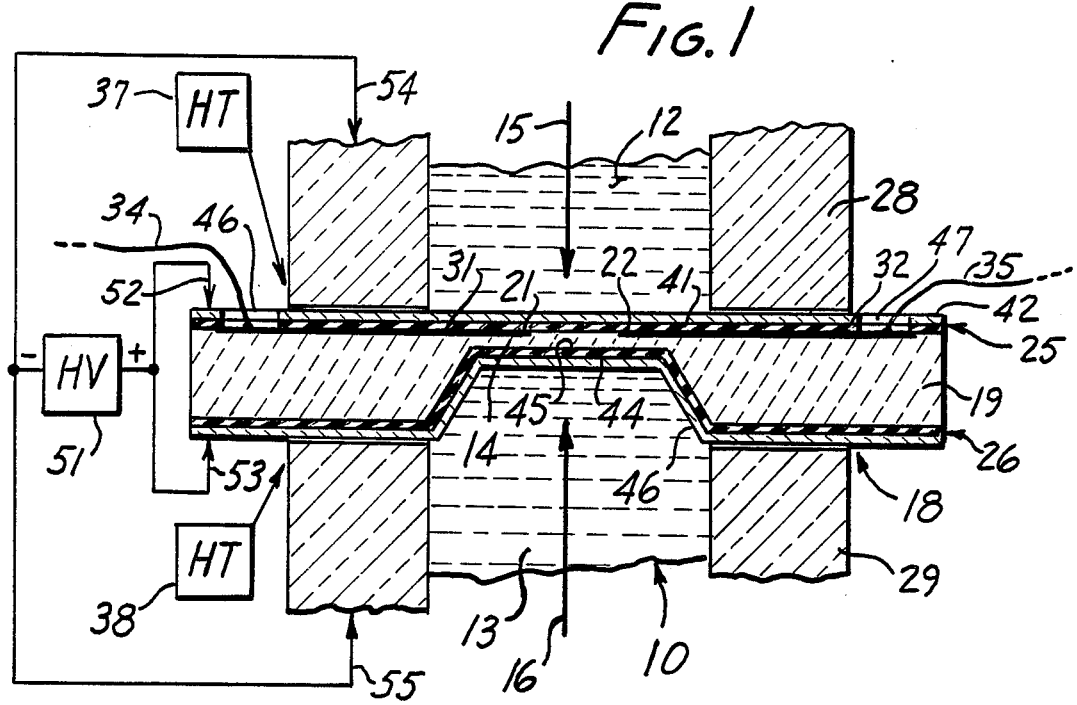
FIG. 1 is a section through a differential transducer according to a preferred embodiment of the subject invention, and a block diagram of a method of making same according to an embodiment of the invention.

FIG. 1 shows a section through a differential transducer 10 according to a preferred embodiment of the subject invention, for corrosive or conductive fluids 12 and 13 proceeding toward a diaphragm 14 from both sides, as indicated by arrows 15 and 16.

The differential transducer 10 has an integrated bonded structure 18 of a semiconductor wafer 19 including the semiconductor diaphragm 14 containing embedded strain gages 21 and 22 and being sandwiched between layers of material 25 and 26 electrically insulating and isolating the diaphragm and strain gages from the corrosive or conductive fluids 12 and 13, and first and second tubes 28 and 29 electrostatically bonded to these layers on opposite sides of the semiconductor wafer 19 for guiding corrosive or electrically conductive fluids 12 and 13 to the layers at the semiconductor diaphragm 14. As seen in the drawings, the semiconductor wafer 19 extends beyond the perimeter of at least one of the tubes.

The strain gages 21 and 22 have embedded electrical leads 31 and 32 extending beyond the latter perimeter of at least one of the tubes, for attachment of electrical contact wires 34 and 35 outside of that one tube 28. The embedded electrical leads 31 and 32 are inlaid in the semiconductor wafer 19, at least in a region covered by that one tube 28, or along the lengths of such leads, as shown in the drawings. By way of example, the embedded strain gages and electrical leads may be formed by diffusion or ion implantation.

Figure 2:
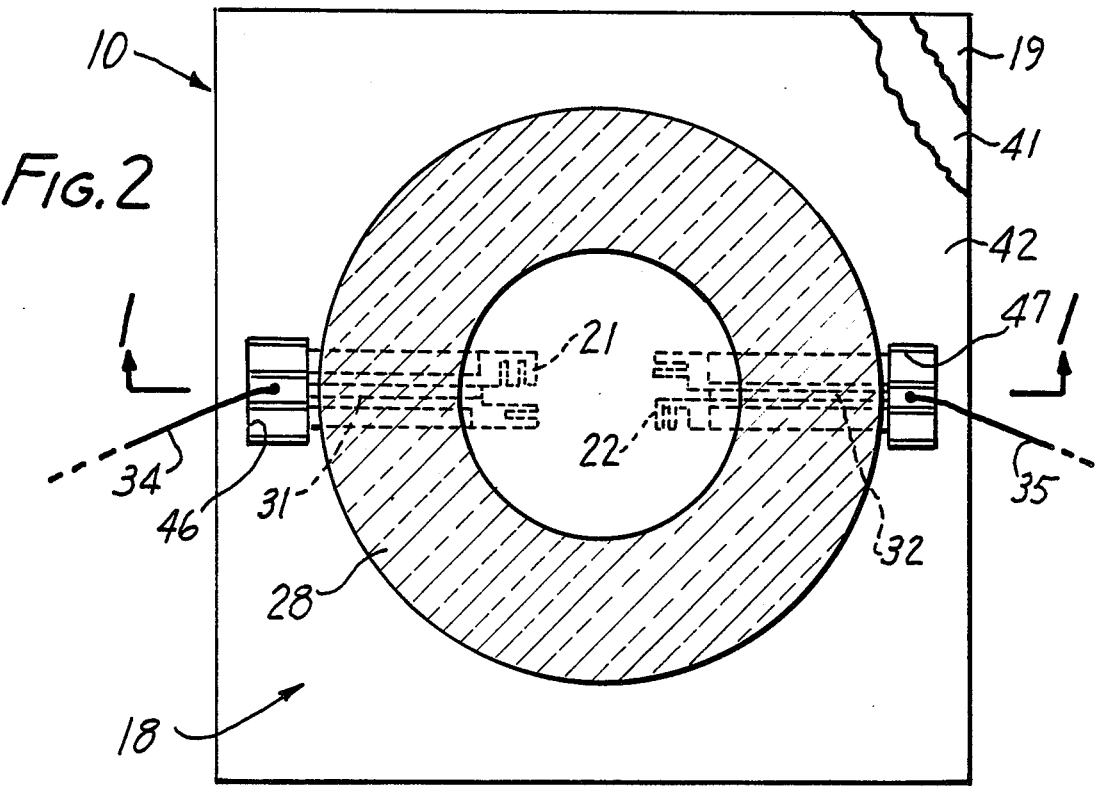
FIG. 2 is a top view of the differential transducer of FIG. 1, indicating at 1—1 the section of FIG. 1.
Figure 3:
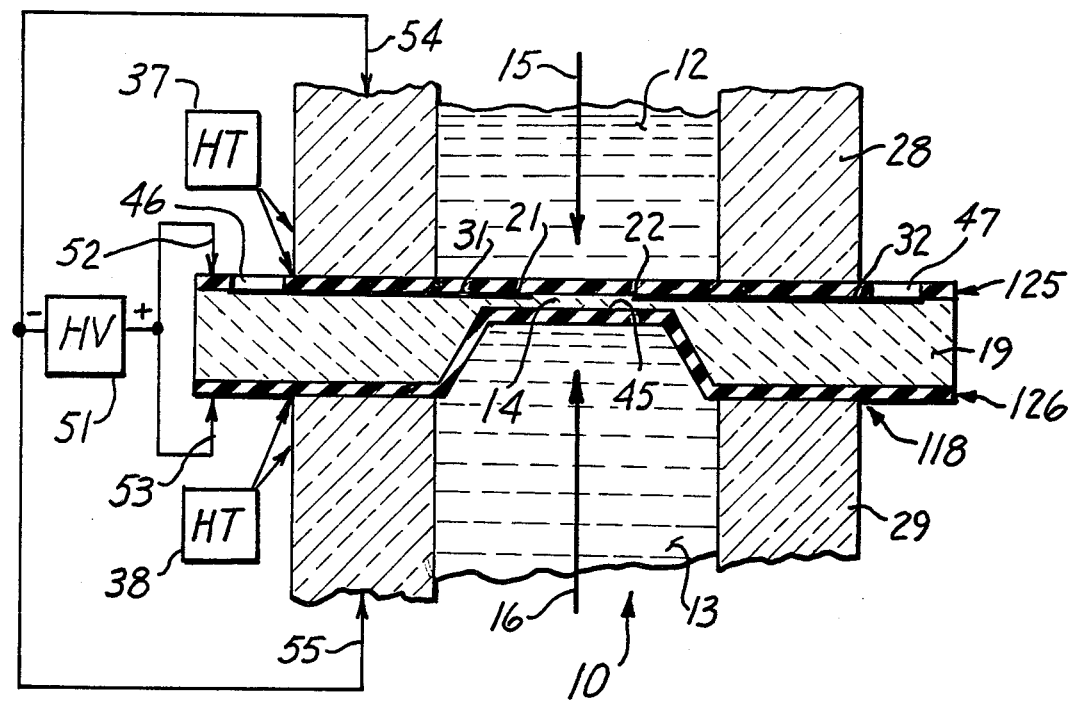
FIG. 3 is a view similar to FIG. 1, showing a differential transducer according to another embodiment of the subject invention.

The subject invention also resides in methods of making differential transducers, such as the transducers shown in FIGS. 1 to 3, for corrosive or electrically conductive fluids 12 and 13, guided by a first tube 28 toward one side of the semiconductor diaphragm 14 containing embedded strain gages 12 and 22, and guided by a second tube 29 toward an opposite side of that semiconductor diaphragm.

According to the invention, the tubes 28 and 29 are made of an electrically insulating material temporarily convertible to an electrical conductor for electrostatic bonding, as more fully described hereinafter.

As already indicated above, the semiconductor diaphragm 14 is provided in a semiconductor wafer 19 extending beyond the perimeter of at least the first tube 28. The strain gages 21 and 22 are provided with embedded electrical leads 31 and 32 extending beyond that perimeter for attachment of electrical contact wires 34, 35, etc. outside the first tube 28, while providing the leads 31 and 32 inlaid in the semiconductor wafer, at least in a region to be covered by the first tube 28.

The method according to the illustrated preferred embodiments further includes integrally sandwiching the wafer 19 including the semiconductor diaphragm 14 between layers of material 25 and 26 providing electrical conduction for electrostatic bonding at the tubes 28 and 29 and for electrical insulation and isolation of the diaphragm 14 and strain gages 21 and 22 from corrosive or electrically conductive fluids 12 and 13, guided toward the diaphragm by the tubes 28 and 29.

Each of the tubes 28 and 29 is then temporarily converted to an electrical conductor, such as by heating, as indicated by blocks 37 and 38, labelled HT for "heat."

The first and second tubes 28 and 29 are then electrostatically bonded to the layers 25 and 26 with the aid of their electrical conduction to form the tubes 28 and 29, layers 25 and 26 and wafer 19 with semiconductor diaphragm 14, strain gages 21 and 22 and electrical leads 31 and 32 into an integrated bonded structure 18.

In the preferred embodiment of the invention shown in FIGS. 1 and 2, the layers 25 include a layer 41 of electrically insulating material on one side of the wafer including the semiconductor diaphragm 14, strain gages 21 and 22 and electrical leads 31 and 32, and a layer 42 of electrically conductive material bonded to that layer 41 of electrically insulating material and electrostatically bonded to the first tube 28.

Similarly, the layers 26 are provided with a layer 44 of electrically insulating material on the wafer 19 at the opposite side 45 of the semiconductor diaphragm, and with a layer 46 of electrically conductive material, which is bonded to the layer 44 of electrically insulating material and is electrostatically bonded to the second tube 29.

The strain gages 21 and 22 and the electrical leads 31 and 32 may be provided in the wafer 19 with embedded techniques which may be conventional and are not part of the subject invention as such. Numerous diffusion and imolantation techniques are in fact extensively known and regularly practiced in the mass production of semiconductor strain gages. The inactive side 45 of the wafer 19 is etched to produce a diaphragm 14 of appropriate thickness for the pressure range desired. Such etching also is conventional in the mass production of semiconductor sensor structures and does not as such form part of the subject invention.

By way of example, the layers of insulating material 41 and 44 may be made of silicon nitride, silicon dioxide, borophosphosilicate glass, such as Pyrex, and the like. These and other layers of dielectric material may, for instance, be deposited or chemically grown on the wafer 19 by techniques conventional per se.

To provide additional corrosion protection and facilitate anodic or electrostatic bonding of the ports or tubes 28 and 29, the layers or films 42 and 46 of a metal or other electrically conductive material are deposited or provided on the dielectric layers 41 and 44. Conventional techniques may also be employed for that phase of manufacture of the integrated structure 18.

In the case of the composite layer 25, windows 46 and 47 are left or provided in the insulating and conducting layers 41 and 42 for access to the electrical leads 31 and 32 or to terminals embedded in the wafer 19 and integral with the embedded leads 31 and 32.

The tubes 28 and 29 may be of glass or another material that can be electrostatically bonded. In this respect, reference may be had to the above mentioned Pomerantz and Pomerantz et al patents, which are herewith incorporated by reference herein, and which were issued to P. R. Mallory and Co., developer and promoter of the Mallory electrostatic bonding process.

In one way of practicing that process, the tubes 28 and 29 are heated, as indicated at 37 and 38. By way of example, in the case of glass, the tubes 28 and 29 may be heated to temperatures of several hundred centigrades. Such elevated temperatures are chosen to increase the conductivity of the glass and to allow the glass or similar material in the tubes 28 and 29 to deform sufficiently to mate the surfaces of the composite layers 25 and 26 or metal layers 42 and 46. Typically, such elevated temperatures are several hundred centigrades below the softening point of glass.

The glass or similar material then behaves as an electrolyte, whereby a thin layer of glass or similar material at the metal film or positive electrode 42 becomes polarized. Accordingly, moderate voltages can produce extremely high electrostatic fields in the region where the glass tubes 28 and 29 face the metal films 42 and 46 which, in turn, gives rise to similarly high fields in gaps between the tubes 28 and 29 and films 42 and 46, which are present even with the flatest of layers and tube ends.

The resulting high fields and electrostatic attraction between the tubes 28 and 29 and layers 42 and 46 enable bonding at electrical potentials in the 100 volt range, but bonding is usually done at potentials in the 1,000 volt range.

A high voltage source, HV, 51 is shown for applying the voltage or electrical potential required for bonding to positive and negative electrodes 52, 53, and 54, 55, respectively.

Bonding may be done in a clean air environment. However, if it is desirable to suppress oxidation, bonding may be done in vacuum, nitrogen or another inert atmosphere.

In the embodiment of the invention shown in FIG. 3, the counterparts of the layers 25 and 26 in FIG. 1 are shown at 125 and 126. In this respect, while the layers 25 and 26 in FIG. 1 are composite layers, each of the layers 125 and 126 in FIG. 3 may be a single layer. It should also be understood in this context that the layer 125 may be combined with the composite layer 26 or that the layer 126 shown in FIG. 3 may be combined with the composite layer 25 shown in FIG. 1, within the scope of the subject invention as set forth in the accompanying claims.

The layers 125 and 126 provide electrical insulation and isolation of the diaphragm 14 and strain gages 21 and 22 from corrosive or electrically conductive fluids 12 and 13, as do the composite layers 25 and 26 described above. However, the layers 125 and 126 are temporarily convertible to an electrical conductor for electrostatic bonding to the tubes 28 and 29. Materials which are so convertible and suitable for the layers 125 and 126 include silicon nitride doped with silicon, silicon dioxide doped with silicon, borophosphosilicate or any other material which is a good electrical insulator at device operating temperatures and which becomes electrically conductive at the elevated electrostatic bonding temperatures materially above operating temperatures of the differential transducer, and which thereafter reverts to an electrical insulator upon cooling.

As indicated by way of example with the aid of two arrows at the heat source 37 and two arrows at the heat source 38 in FIG. 3, the layers 125 and 126 are heated along with the tubes 28 and 29 for electrostatic bonding. In this embodiment of the invention, normally insulating layers 125 and 126 temporarily may be converted to electrical conductors by heat from the sources 37 and 38 and the high voltage from the source 51 may then be employed for electrostatically bonding the first and second tubes 28 and 29 to the layers 125 and 126 with the aid of the electrical conduction of the layers 125 and 126, so as to form these tubes, layers and wafer 19 with semiconductor diaphragm 14, strain gages 21 and 22 and electrical leads 31 and 32 into an integrated bonded structure 118, similar to the integrated bonded structure 18 shown in FIG. 1.

Elaborating further on the above mentioned combination of the teachings of FIGS. 1, 2 and 3, the above mentioned layers may, for example, be provided as a layer 41 of electrically insulating material on one side of the wafer 19 including the semiconductor diaphragm 14, strain gages and electrical leads 21, 22, 31 and 32, as a layer of electrically conductive material 42, and on the wafer at the opposite side of the semiconductor diaphragm 14 as a layer 126 of a material providing electrical insulation and isolation of the wafer 19 from corrosive or electrically conductive fluids guided towards the diaphragm by the second tube 29, and being temporarily convertible to an electrical conductor, as disclosed above, for electrostatic bonding to that second tube 29.

The tubes 28 and 29, and the layer 126 of convertible material shown in FIG. 3, are temporarily converted to electrical conductors, such as by heat from the sources 37 and 38, for electrostatic bonding of the first tube 28 to the layer 42 of electrically conductive material bonded to the layer 41 of electrically insulating material, as shown in FIG. 1, and for electrostatic bonding of the second tube 29 to the temporarily converted layer 126 as shown in FIG. 3.

Conversely, starting first with FIG. 3, the above mentioned layers may be provided as a layer 125 of a material providing electrical insulation and isolation of the diaphragm 14 and strain gages 21 and 22 from corrosive or electrically conductive fluids guided towards the diaphragm by the first tube 28, and being temporarily convertible to an electrical conductor for electrostatic bonding to that first tube, and, with reference to the lower part of FIG. 1, as a layer of electrically insulating material 44 on the wafer 19 at the opposite side 45 of the semiconductor diaphragm 14, and as a layer 46 of electrically conductive material bonded to the layer 44 of electrically insulating material. The tubes 28 and 29 and the layer 125 of convertible material again are temporarily converted to electrical conductors for electrostatic bonding of the first tube 28 to the temporarily converted layer 125, as shown in FIG. 3, and for electrostatic bonding of the second tube 29 to the layer 46 of electrically conductive material bonded to the layer 44 of electrically insulating material, as shown in FIG. 1.

The drawings, while appearing to show only two embodiments, actually show four; namely, the embodiment shown in FIGS. 1 and 2, the embodiment shown in FIG. 3, the variant in which the composite layer 25 of FIG. 1 is combined with the convertible layer 126 of FIG. 3, and the converse variant in which the composite layer 26 of FIG. 1 is combined with the convertible top layer 125 of FIG. 3.

In each case, the ports or tubes 28 and 29, layers 25 and 26, 25 and 126, 26 and 125, or 125 and 126, the wafer 19 with semiconductor diaphragm 14, strain gages 21 and 22 and electrical leads 31 and 32, present an integrated bonded structure free of the above mentioned deficiencies and shortfalls of prior proposals, and differential transducers for corrosive or electrically conductive fluids.

While the scope of the subject invention is not limited to use of particular materials, a particularly favorable situation exists, if the wafer 19 with strain gages are made of silicon, since commercial glasses are available for the tubes 28 and 29 which match the thermal expansion of silicon very closely. This is, however, not an absolute requirement, since the above mentioned electrostatic bonding process and the bonded products resulting therefrom tolerate a certain thermal mismatch.

The subject extensive disclosure will render apparent or suggest to those skilled in the art various modifications and variations within the spirit and scope of the subject invention and equivalents thereof.

I claim:

1. In a differential transducer for corrosive or conductive fluids, the improvement comprising in combination:
   an integrated bonded structure of a semiconductor wafer including a semiconductor diaphragm containing embedded strain gages and being sandwiched between layers of material electrically insulating and isolating said diaphragm and strain gages from said corrosive or conductive fluids, and first and second tubes electrostatically bonded to said layers on opposite sides of said semiconductor wafer for guiding corrosive or electrically conductive fluids to said layers at said semiconductor diaphragm;
   said semiconductor wafer extending beyond the perimeter of at least one of said tubes; and
   said strain gages having embedded electrical leads extending beyond said perimeter for attachment of electrical contact wires outside said one tube and being inlaid in said semiconductor wafer at least in a region covered by said one tube.

2. A differential transducer as claimed in claim 1, wherein:
   said layers include a layer of electrically insulating material on one side of said wafer including said semiconductor diaphragm, strain gages and electrical leads, and a layer of electrically conductive material bonded to said layer of electrically insulating material and electrostatically bonded to said first tube.

3. A differential transducer as claimed in claim 1, wherein:
   said layers include a layer of electrically insulating material on said wafer at an opposite side of the semiconductor diaphragm, and a layer of electrically conductive material bonded to said layer of electrically insulating material and electrostatically bonded to said second tube.

4. A differential transducer as claimed in claim 1, wherein:
   said layers include a first layer of electrically insulating material on one side of said wafer including said semiconductor diaphragm, strain gages and electrical leads, a first layer of electrically conductive material bonded to said layer of electrically insulating material and electrostatically bonded to said first tube, a second layer of electrically insulating material on said wafer at an opposite side of the semiconductor diaphragm, and a second layer of electrically conductive material bonded to said second layer of electrically insulating material and electrostatically bonded to said second tube.

5. A differential transducer as claimed in claim 1, wherein:
   said layers include a layer of electrically insulating material on one side of said wafer including said semiconductor diaphragm, strain gages and electrical leads, a layer of electrically conductive material bonded to said layer of electrically insulating material, and on said wafer at an opposite side of the semiconductor diaphragm a layer of a material providing electrical insulation and isolation of said wafer from corrosive or electrically conductive fluids guided toward said diaphragm by said second tube, and temporarily convertible to an electrical conductor at temperatures materially above operating temperatures of said differential transducer.

6. A differential transducer as claimed in claim 1, wherein:
   said layers include on one side of said wafer including said semiconductor diaphragm, strain gages and electrical leads, a layer of a material providing electrical insulation and isolation of said diaphragm and strain gages from corrosive or electrically conductive fluids guided toward said diaphragm by said first tube, and temporarily convertible to an electrical conductor at temperatures materially above operating temperatures of said differential transducer, a layer of electrically insulating material on said wafer at an opposite side of the semiconductor diaphragm, said a layer of electrically conductive material bonded to said layer of electrically insulating material.

7. A differential transducer as claimed in in claim 1, wherein:
   said layers include layers of material providing electrical insulation and isolation of said diaphragm and strain gages from corrosive or electrically conductive fluids guided toward said diaphragm by said tubes, and temporarily convertible to electrical conductors at temperatures above operating temperatures of said differential transducer.

8. A differential transducer as claimed in claim 1, wherein:
   said layers include on at least one side of said wafer a layer of a material selected from the group consisting of silicon nitride, silicon dioxide and borophosphosilicate glass.

9. A differential transducer as claimed in claim 8 wherein:
   said layers include a metal layer bonded to said layer of a material selected from the group consisting of silicon nitride, silicon dioxide and borophosphosilicate glass, and electrostatically bonded to one of said tubes.

10. A differential transducer as claimed in in claim 1, wherein:
    said layers include on at least one side of said wafer a layer of electrically insulating material, and a metal layer bonded to said layer of electrically insulating material and electrostatically bonded to one of said tubes.

11. In a method of making a differential transducer for corrosive or electrically conductive fluids guided by a first tube toward one side of a semiconductor diaphragm containing embedded strain gages, and guided by a second tube toward an opposite side of said semiconductor diaphragm, the improvement comprising in combination the steps of:
    making said tubes of an electrically insulating material temporarily convertible to an electrical conductor for electrostatic bonding;
    providing said semiconductor diaphragm in a semiconductor wafer extending beyond the perimeter of at least said first tube;
    providing said strain gages with embedded electrical leads extending beyond said perimeter for attachment of electrical contact wires outside said first tube, while providing said leads inlaid in said semiconductor wafer at least in a region to be covered by said first tube;

integrally sandwiching said wafer including said semiconductor diaphragm between layers of material providing electrical conduction for electrostatic bonding at said tubes and electrical insulation and isolation of said diaphragm and strain gages from corrosive or electrically conductive fluids guided toward said diaphragm by said tubes;

temporarily converting each of said tubes to an electrical conductor; and electrostatically bonding said first and second tubes to said layers with the aid of said electrical conduction to form said tubes, layers and wafer with semiconductor diaphragm, strain gages and electrical leads into an integrated bonded structure.

12. A method as claimed in claim 11, wherein:

said layers are provided with a layer of electrically insulating material on one side of said wafer including said semiconductor diaphragm, strain gages and electrical leads, and with a layer of electrically conductive material; and said layer of electrically conductive material is bonded to said layer of electrically insulating material and is electrostatically bonded to said first tube.

13. A method as claimed in claim 11, wherein:

said layers are provided with a layer of electrically insulating material on said wafer at said opposite side of the semiconductor diaphragm, and with a layer of electrically conductive material; and said layer of electrically conductive material is bonded to said layer of electrically insulating material and is electrostatically bonded to said second tube.

14. A method as claimed in claim 11, wherein:

said layers are provided with a first layer of electrically insulating material on one side of said wafer including said semiconductor diaphragm, strain gages and electrical leads, with a first layer of electrically conductive material which is bonded to said layer of electrically insulating material and is electrostatically bonded to said first tube, with a second layer of electrically insulating material on said wafer at said opposite side of the semiconductor diaphragm, and with a second layer of electrically conductive material which is bonded to said second layer of electrically insulating material and is electrostatically bonded to said second tube.

15. A method as claimed in claim 11, wherein:

said layers are provided as a layer of electrically insulating material on one side of said wafer including said semiconductor diaphragm, strain gages and electrical leads, as a layer of electrically conductive material bonded to said layer of electrically insulating material, and on said wafer at said opposite side of the semiconductor diaphragm as a layer of a material providing electrical insulation and isolation of said wafer from corrosive or electrically conductive fluids guided toward said diaphragm by said second tube, and being temporarily convertible to an electrical conductor for electrostatic bonding to said second tube; and said tubes and said layer of convertible material are temporarily converted to electrical conductors for electrostatic bonding of said first tube to said layer of electrically conductive material bonded to said layer of electrically insulating material and for electrostatic bonding of said second tube to the temporarily converted layer.

16. A method as claimed in claim 11, wherein:

said layers are provided as a layer of a material providing electrical insulation and isolation of said diaphragm and strain gages from corrosive or electrically conductive fluids guided toward said diaphragm by said first tube, and being temporarily convertible to an electrical conductor for electrostatic bonding to said first tube, as a layer of electrically insulating material on said wafer at said opposite side of the semiconductor diaphragm, and as a layer of electrically conductive material bonded to said layer of electrically insulating material; and said tubes and said layer of convertible material are temporarily converted to electrical conductors for electrostatic bonding of said first tube to the temporarily converted layer and for electrostatic bonding of said second tube to said layer of electrically conductive material bonded to said layer of electrically insulating material.

17. A method as claimed in claim 11, wherein:

said layers are provided on at least one side of said wafer with a layer of electrically insulating material, and with a metal layer; and said metal layer is bonded to said layer of electrically insulating material and is electrostatically bonded to one of said tubes.

18. A method as claimed in claim 11, wherein:

said layers are provided on at least one side of said wafer with a layer of a material selected from the group consisting of silicon nitride, silicon dioxide and borophosphosilicate glass.

19. A method as claimed in claim 8, including the step of:

bonding a metal layer to said layer of a material selected from the group consisting of silicon nitride, silicon dioxide and borophosphosilicate glass, and electrostatically bonding one of said tubes to said metal layer.

20. In a method of making a differential transducer for corrosive or electrically conductive fluids guided by a first tube toward one side of a semiconductor diaphragm containing embedded strain gages, and guided by a second tube toward an opposite side of said semiconductor diaphragm, the improvement comprising in combination the steps of:

making said tubes of an electrically insulating material temporarily convertible to an electrical conductor for electrostatic bonding;

providing said semiconductor diaphragm in a semiconductor wafer extending beyond the perimeter of at least said first tube;

providing said strain gages with embedded electrical leads extending beyond said perimeter for attachment of electrical contact wires outside said first tube, while providing said leads inlaid in said semiconductor wafer at least in a region to be covered by said first tube;

integrally sandwiching said wafer including said semiconductor diaphragm between layers of material providing electrical insulation and isolation of said diaphragm and strain gages from corrosive or electrically conductive fluids guided toward said diaphragm by said tubes, and being temporarily convertible to an electrical conductor for electrostatic bonding to said tubes;

temporarily converting each of said tubes and said layers of material to an electrical conductor; and electrostatically bonding said first and second tubes to said layers with the aid of said electrical conduction to form said tubes, layers and wafer with semiconductor diaphragm, strain gages and electrical leads into an integrated bonded structure.

* * * * *